United States Patent
Liu et al.

(10) Patent No.: US 8,724,259 B1
(45) Date of Patent: May 13, 2014

(54) CONFORMAL HIGH MOMENT SIDE SHIELD SEED LAYER FOR PERPENDICULAR MAGNETIC RECORDING WRITER

(75) Inventors: Feng Liu, San Ramon, CA (US); Dehua Han, Fremont, CA (US); Yugang Wang, Milpitas, CA (US); Zhigang Bai, Milpitas, CA (US); Tao Pan, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/493,903

(22) Filed: Jun. 11, 2012

(51) Int. Cl.
  *G11B 5/147* (2006.01)
(52) U.S. Cl.
  USPC .................................................. 360/125.15
(58) Field of Classification Search
  USPC ............ 360/125.06, 125.08, 125.11, 125.12, 360/125.13, 125.14, 125.15, 125.3
  See application file for complete search history.

(56) References Cited

U.S. PATENT DOCUMENTS

| | | | |
|---|---|---|---|
| 6,562,487 B1 | 5/2003 | Vas'ko et al. | |
| 7,263,762 B2 | 9/2007 | Bedell et al. | |
| 7,872,835 B2 | 1/2011 | Guan | |
| 7,920,359 B2 | 4/2011 | Maruyama et al. | |
| 7,978,431 B2 * | 7/2011 | Han et al. | 360/125.3 |
| 7,979,978 B2 | 7/2011 | Han et al. | |
| 7,983,001 B2 * | 7/2011 | Sato et al. | 360/125.03 |
| 8,174,790 B2 * | 5/2012 | Sasaki et al. | 360/125.13 |
| 8,189,295 B2 * | 5/2012 | Han et al. | 360/125.3 |
| 8,243,387 B2 * | 8/2012 | Yamaguchi et al. | 360/125.12 |
| 8,277,669 B1 * | 10/2012 | Chen et al. | 216/22 |
| 8,400,733 B2 * | 3/2013 | Shin et al. | 360/125.15 |
| 8,470,186 B2 * | 6/2013 | Chen et al. | 216/22 |

* cited by examiner

*Primary Examiner* — Angel Castro

(57) ABSTRACT

A perpendicular magnetic recording writer for use in a data storage device, the recording transducer has a magnetic writer pole, a pole tip facing an air bearing surface (ABS). The pole tip has a pole face, leading side wall, a trailing side wall, a first side wall and a second side wall. A trailing side wall nonmagnetic gap layer on the trailing side wall, a first side wall nonmagnetic gap layer deposited on the first side wall, and a second side wall nonmagnetic gap layer deposited on the second side wall. A high magnetic moment seed layer is deposited on the trailing side wall nonmagnetic gap layer, the first side wall nonmagnetic gap layer, and the second side wall nonmagnetic gap layer. In other aspects of the invention shields are provided that have magnetic moments less than the magnetic moment of the seed layers.

3 Claims, 4 Drawing Sheets

ABS View

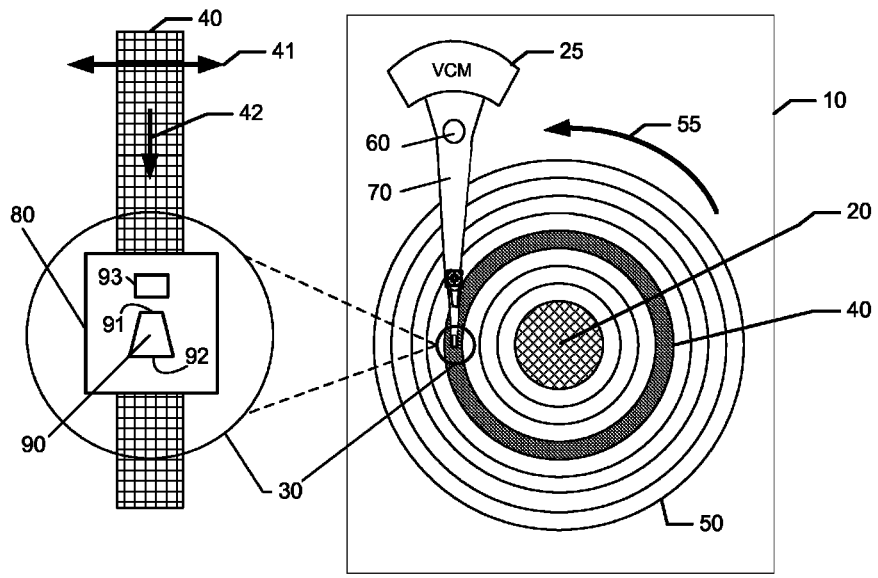
FIG. 1a  FIG. 1
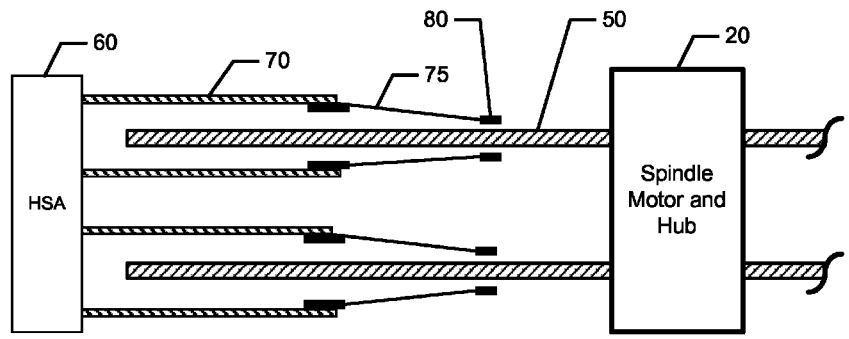
FIG. 2

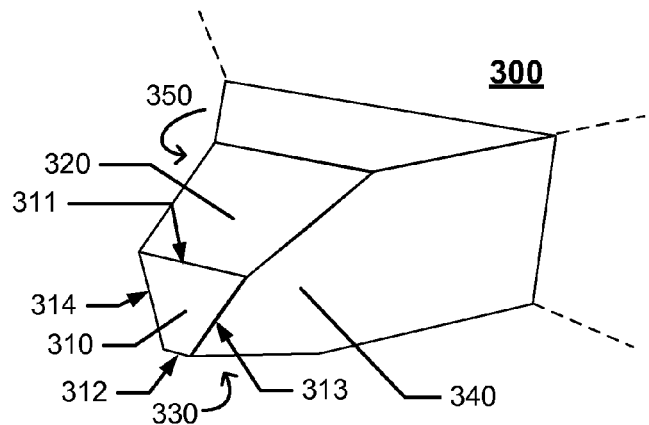
FIG. 3
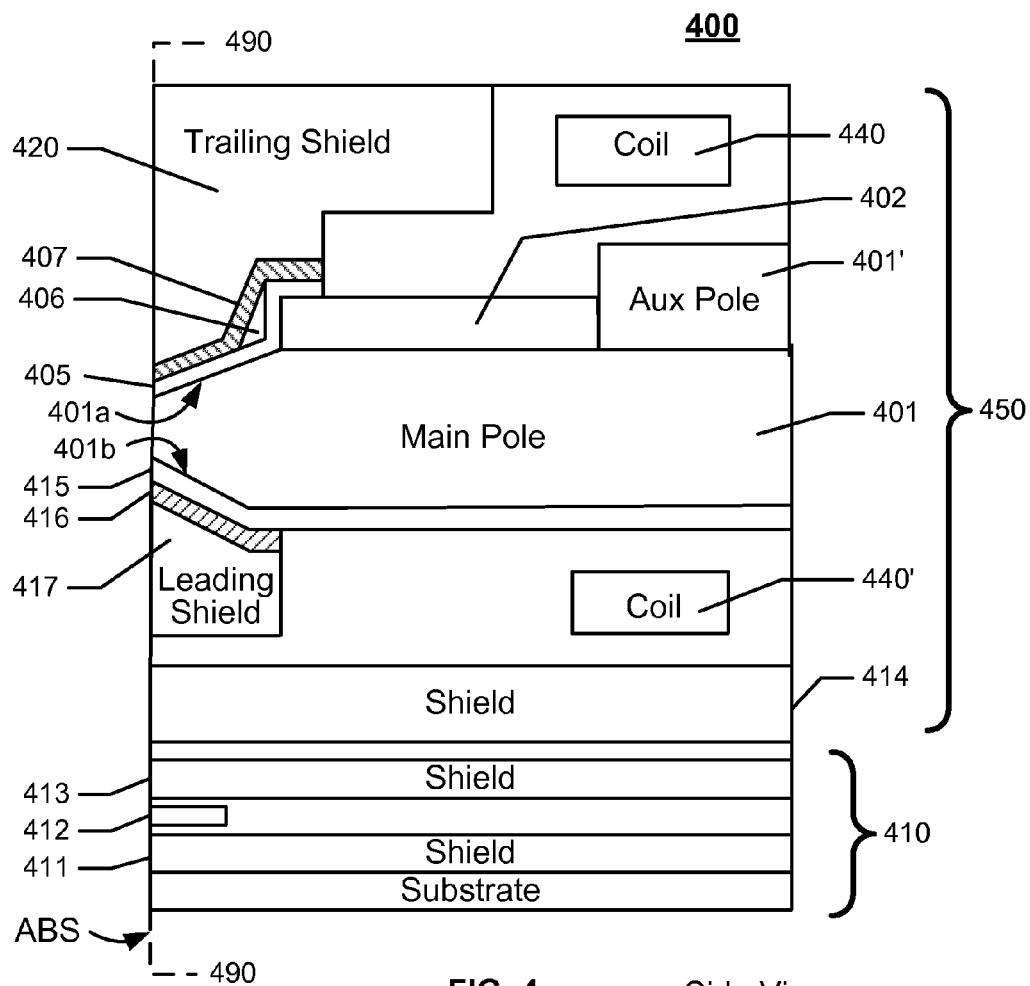
FIG. 4    Side View

US 8,724,259 B1

CONFORMAL HIGH MOMENT SIDE SHIELD SEED LAYER FOR PERPENDICULAR MAGNETIC RECORDING WRITER

BACKGROUND OF THE INVENTION

Disk drives typically use heads residing on sliders to read from and write to the magnetic media. Read and write transducers residing in the head are flown at a small, controlled spacing above the magnetic medium (disk) during read and write operations. An air bearing forms between the head and the disk due to the disk rotating at high speeds to provide controlled head to disk spacing. Magnetic fields emanating from the write transducer pole tip switches magnetization of the magnetic medium, i.e., writing to the medium. Among other factors, a smaller and more tightly controlled magnetic writing field will allow more data to be written in the same space, thereby increasing areal density.

FIG. 1 illustrates a conventional disk drive 10 used for data storage. Figures are not drawn to scale and only certain structures are depicted for clarity. Disk media 50 is attached to spindle motor and hub 20. The spindle motor and hub 20 rotate the media 50 in a direction shown by arrow 55. Head stack assembly (HSA) 60 includes a magnetic recording head 30 on actuator arm 70 and positions actuator arm 70 by positioning the voice coil motor (VCM) 25 over a desired data track, shown as recording track 40 in this example, to write data onto the media 50.

FIG. 1a illustrates an enlarged view of a section of FIG. 1 including head 30 and track 40. A magnetic recording transducer 90 is fabricated on slider 80. Slider 80 may be attached to suspension 75 and suspension 75 may be attached to actuator arm 70 as shown in FIG. 2. A read transducer 93 is also fabricated on slider 80.

Referring again to FIG. 2, Slider 80 is illustrated above recording track 40. Media 50 and track 40 are moving under slider 80 in a down-track direction shown by arrow 42. The cross-track direction is shown by arrow 41.

The magnetic recording transducer 90 has a leading edge 91 and a trailing edge 92. In this embodiment, the trailing edge 92 of recording transducer 90 is the final portion of magnetic transducer 90 that writes onto the recording track 40 as the media moves under the slider 80 in down-track direction 42.

FIG. 2 illustrates a side view of the disk drive 10 shown in FIG. 1. At least one disk media 50 is mounted onto spindle motor and hub 20. HSA 60 comprises at least one actuator arm 70 that carries suspension 75 and slider 80. Slider 80 has an air bearing surface (ABS) facing media 50. When the media is rotating and actuator arm 70 is positioned over the media 50, slider 80 floats above media 50 by aerodynamic pressure created between the slider ABS and the surface of media 50 facing the ABS of slider 80.

BRIEF DESCRIPTION OF THE DRAWINGS

FIGS. 1 and 1a illustrate a top view of conventional hard disk drive,

FIG. 2 illustrates a side view of a conventional hard disk drive

FIG. 3 illustrates a perspective view of a main pole tip section of a perpendicular magnetic recording transducer in accordance with one aspect of the subject invention.

FIG. 4 illustrates a section of a side view of a read/write head in accordance with one aspect of the subject invention.

DETAILED DESCRIPTION OF THE INVENTION

Figure 5:
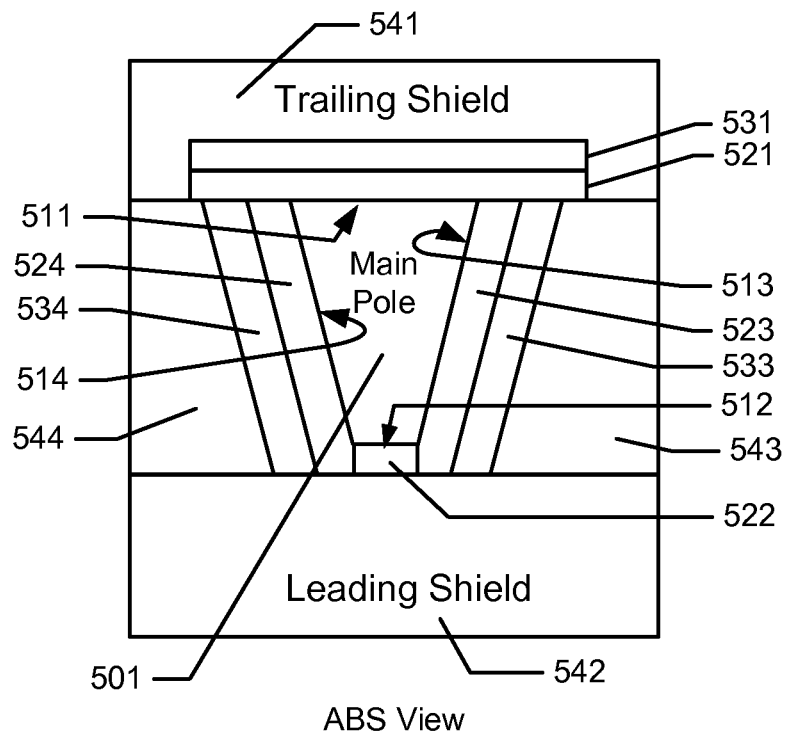
FIG. 5 illustrates an ABS view of a section of a perpendicular magnetic recording transducer in accordance with one aspect of the subject invention.

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention. References to top, side, bottom, or similar terms are used for descriptive purposes with reference to the figures and descriptions and should not be taken as limiting the scope of the invention FIG. 3 illustrates a perspective view of a main pole tip section 300 of a perpendicular magnetic recording transducer in accordance with one aspect of the subject invention. Main pole tip section 300 has a pole tip face 310 that faces the ABS. Pole tip face 310 is illustrated in a trapezoidal shape having a trailing edge 311, leading edge 312, first side wall edge 313, and second side wall edge 314. First side wall 340 extends distally from the first side wall edge 313, second side wall 350 (not visible, opposite first side wall 340) extends distally from second side wall edge 314, trailing side wall 320 extends distally from trailing edge 311, and leading side wall 330 (not visible, opposite trailing side wall 320) extends distally from leading edge 312.

Main pole tip section 300 is illustrated with a trapezoidal shape at the ABS with trailing edge 311 wider than leading edge 312; however, other shapes may also be used within the scope of the invention. In other embodiments, for example, side wall edge 313 and side wall edge 314 and corresponding side wall 340 and side wall 350 may have facets or a curved shape; the leading edge 312 may be small, or form a point; and a trapezoid shape is not required, and may be a rectangle, or another shape having side walls. Pole surfaces and edges illustrated with straight lines may also be implemented as curved or faceted. One ordinarily skilled in the art will recognize that these shapes, combinations or variations of these shapes, and other shapes may be used without departing from the spirit of the invention.

FIG. 4 illustrates an embodiment of the invention in a side section view of read/write head 400 incorporating a write transducer 450 and read sensor 410, both facing the ABS 490. The read sensor 410 may include shield 411 and shield 413 as well as sensor 412. Write transducer 450 includes shield 414, main pole 401, assist pole (or auxiliary pole) 401', coil 440 and coil 440', leading shield 417 and trailing shield 420. Side shields are not shown in this sectional view, however reside on the sides of main pole 401 and will be described in the following figures and descriptions. Main pole 401 has trailing bevel 401a and a leading bevel 401b. A leading nonmagnetic gap layer 415 separates main pole 401 from underlying structures, and trailing nonmagnetic gap layer 405 separates main pole 401 from structures above. A spacer 406 may be included on a portion of trailing bevel 401*a* to provide magnetic separation between main pole 401 and magnetic structures above. A nonmagnetic spacer layer 402 is illustrated on the non-beveled section of main pole 401; however, may be provided above main pole 401 beginning at any point distal from the ABS 490, including on bevel 401*a*. In one aspect of the invention, trailing seed layer 407 overlays trailing nonmagnetic gap layer 405 and spacer 406. In another aspect of the invention, leading seed layer 416 is provided between leading nonmagnetic gap layer 415 and leading shield 417.

In aspects of some embodiments of the invention, trailing seed layer 407 and leading seed layer 416 comprise a first magnetic material having a magnetic moment ($B_s$) between 2.0 Tesla (T) and 2.4 T. In another aspect of the invention, the trailing shield 420 and leading shield 417 comprise a second magnetic material having a $B_s$ of between 1.0 T and 2.0 T. In another aspect of the invention the second magnetic material has a $B_s$ less than the $B_s$ of the first magnetic material.

In one aspect of the invention the first magnetic material is deposited by physical vapor deposition (PVD), and in another aspect of the invention the first magnetic material is deposited by ion beam deposition (IBD). In another aspect of the invention, the second magnetic material is deposited by electroplating.

FIG. 5 illustrates an ABS view of a write transducer similar to write transducer 450 illustrated in FIG. 4. The ABS view is the view looking at the pole tip face from the viewpoint of the media surface. Main pole 501 has trailing side wall 511, leading side wall 512, first side wall 513 and second side wall 514; each corresponding respectively to trailing side wall 320, leading side wall 330, first side wall 340, and second side wall 350, as shown in main pole tip section 300 in FIG. 3.

Continuing with FIG. 5, a trailing side wall nonmagnetic gap layer 521 is disposed on the trailing side wall 511; a leading side wall nonmagnetic gap layer 522 is disposed on leading side wall 512; a first side wall nonmagnetic gap layer 523 is disposed on first side wall 513, and a second side wall nonmagnetic gap layer 524 is disposed on second side wall 514. Trailing side wall nonmagnetic gap layer 521 corresponds to trailing nonmagnetic gap layer 405 in read/write head 400 in FIG. 4, and leading side wall nonmagnetic gap layer 522 corresponds to leading nonmagnetic gap layer 415 in read/write head 400 in FIG. 4.

A trailing seed layer 531 is deposited on trailing side wall nonmagnetic gap layer 521; a first side seed layer 533 is deposited on first side wall nonmagnetic gap layer 523, and a second side seed layer 534 is deposited on the second side wall nonmagnetic gap layer 524.

In aspects of some embodiments of the invention, trailing seed layer 531, first side seed layer 533, and second side seed layer 534 comprise a first magnetic material having a magnetic moment ($B_s$) between 2.0 T and 2.4 T.

In one aspect of the invention, first side seed layer 533 and second side seed layer 534 have a layer thickness between 25 nanometers (nm) and 50 nm.

Trailing shield 541 is disposed on the trailing seed layer 531; leading shield 542 is disposed under leading side wall nonmagnetic gap layer 522; first side shield 543 is disposed alongside first side seed layer 533, and second side shield 544 is disposed alongside second side seed layer 534. In one aspect of the invention, trailing shield 541, leading shield 542, first side shield 543, and second side shield 544 may be deposited by electroplating. In one embodiment, trailing shield 541, first side shield 543, and second side shield 544 may be electroplated together in a single plating, and in another aspect of the invention, may form a monolithic structure. In a further embodiment, the electroplating may include leading shield 542 in the same electroplating process. In other aspects of the invention, the shields may be plated separately, and/or with different process parameters.

In another aspect of the invention, the trailing shield 541, leading shield 542, first side shield 543, and second side shield 544 comprise a second magnetic material having a $B_s$ of between 1.0 T and 2.0 T. The first magnetic material and the second magnetic material may comprise a different composition such as differing amounts of iron; and/or may have different magnetic moments due to the method of depositing them, such as IBE, IBD, or electroplating; or by varying the process parameters, such as deposition power or plating current. In another aspect of the invention the second magnetic material has a $B_s$ less than the $B_s$ of the first magnetic material. In a further aspect of the invention, the second magnetic material of the shields 541-544 has a $B_s$ less than the $B_s$ of the first magnetic material of the seed layers 531, 533 and 534, and the second magnetic material has a $B_s$ that increases or decreases with distance from any of the first side seed layer 533 or the second side seed layer 534. A $B_s$ that decreases with distance may provide a reduction of unwanted side shield flux and reduce adjacent track writing. A $B_s$ that increases with distance may provide flux shaping.

In one aspect of the invention the first magnetic material is deposited by physical vapor deposition (PVD), and in another aspect of the invention the first magnetic material is deposited by ion beam deposition (IBD). In another aspect of the invention, the second magnetic material is deposited by electroplating. In yet another aspect, the side shields are plated first, and the trailing shield plated separately.

The addition of a high moment side shield layer that is conformal to the writer pole and separated by a nonmagnetic gap provides advantageous magnetic properties for writing to magnetic medium. The high moment side shield optimizes the write field profile, particularly sharp field contours on the track edge write field without penalizing on-track write field. By improving the side field gradient, adjacent track interference may be reduced, while preserving comparable on-track reverse-overwrite performance. As one result, narrower side gaps, for example side gaps less than 60 nm, may be achieved, as well as maintaining a sufficient write field.

Figure 6:
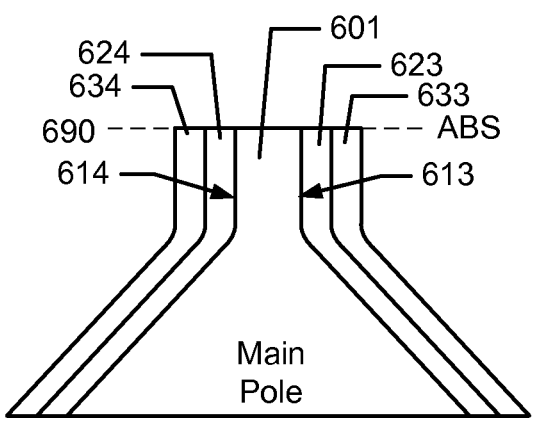
FIG. 6 illustrates a plan view of a section of a perpendicular magnetic recording transducer in accordance with one aspect of the subject invention.

FIG. 6 illustrates a plan view of a section of a perpendicular magnetic recording transducer in accordance with one aspect of the subject invention. The plan view illustrated in FIG. 6 is a section through a main pole analogous to the main pole 501 illustrated in FIG. 5 as viewed from a top perspective, (i.e., a section from the first side shield 543 to the second side shield 544). Main pole 601 has a first side wall 613 and second side wall 614, each extending distally from ABS 690. First side wall nonmagnetic gap layer 623 is adjacent side wall 613 and second side wall nonmagnetic gap layer 624 is adjacent second side wall 614. First side seed layer 633 is on first side wall nonmagnetic gap layer 623, and second side seed layer 634 is on second side wall nonmagnetic gap layer 624.

Figure 7:
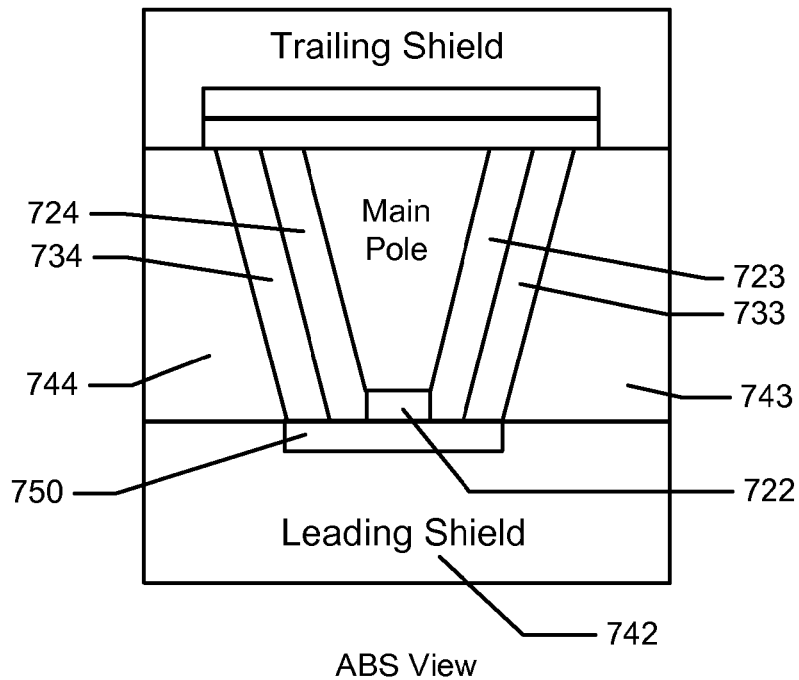
FIG. 7 illustrates an ABS view of a section of a perpendicular magnetic recording transducer in accordance with one aspect of the subject invention.

FIG. 7 illustrates an ABS view of a section of a perpendicular magnetic recording transducer in accordance with one aspect of the subject invention. The embodiment illustrated in FIG. 7 is similar to the embodiment described in FIG. 5, however, with the addition of leading seed layer 750. In one aspect of the invention, leading seed layer 750 is deposited below leading nonmagnetic gap layer 722, first side wall nonmagnetic gap layer 723, and second side wall nonmagnetic gap layer 724. In another aspect, leading seed layer 750 is in contact with first side wall seed layer 733 and second side wall seed layer 724. In one aspect of the invention, leading seed layer 750 is formed of a first magnetic material having a magnetic moment ($B_s$) between 2.0 T and 2.4 T. In another aspect of the invention, leading shield 742, first side shield 743, and second side shield 744 comprise a second magnetic material having a $B_s$ of between 1.0 T and 2.0 T. In another aspect of the invention the second magnetic material has a $B_s$ less than the $B_s$ of the first magnetic material.

Figure 8:
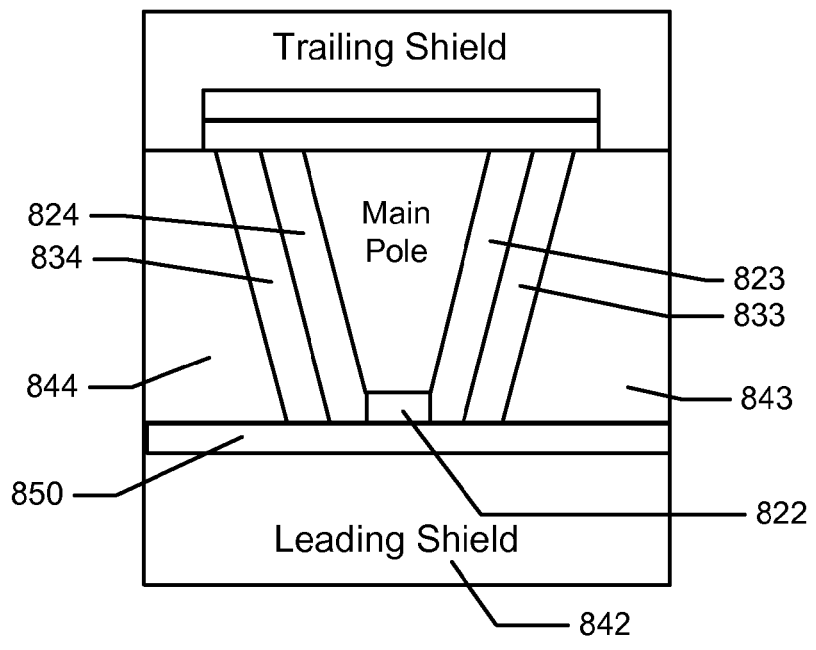
FIG. 8 illustrates an ABS view of a section of a perpendicular magnetic recording transducer in accordance with one aspect of the subject invention.

FIG. 8 illustrates an ABS view of a section of a perpendicular magnetic recording transducer in accordance with one aspect of the subject invention. The embodiment illustrated in FIG. 8 is similar to the embodiment described in FIG. 5, however, with the addition of a leading seed layer 850 between the leading shield 842 and first side shield 843, and also between leading shield 842 and second side shield 844. In one aspect of the invention, leading seed layer 850 is formed of a first magnetic material having a magnetic moment ($B_s$) between 2.0 T and 2.4 T. In another aspect of the invention, leading shield 842, first side shield 843, and second side shield 844 comprise a second magnetic material having a $B_s$ of between 1.0 T and 2.0 T. In another aspect of the invention the second magnetic material has a $B_s$ less than the $B_s$ of the first magnetic material.

Other and/or different components may be fabricated in other embodiments. For example, in some embodiments, coupling layers, stop layers and/or seed layers may also remain between layers as part of the fabrication process.

The description of the invention is provided to enable any person ordinarily skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those ordinarily skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

We claim:

1. A recording transducer for use in a data storage device, the recording transducer comprising a magnetic writer pole, the magnetic writer pole having a pole tip facing an air bearing surface (ABS);

the pole tip comprising a pole face, leading side wall, a trailing side wall, a first side wall and a second side wall;

the recording transducer further comprising:

a trailing side wall nonmagnetic gap layer deposited on the trailing side wall, a first side wall nonmagnetic gap layer deposited on the first side wall, and a second side wall nonmagnetic gap layer deposited on the second side wall, a first portion of the trailing side wall nonmagnetic gap layer being conformal with the trailing side wall and extending from the ABS;

a trailing seed layer comprising a first magnetic material, a first portion of the trailing seed layer extending from the ABS, deposited on a second portion of the trailing side wall nonmagnetic gap layer, being conformal with the trailing side wall nonmagnetic gap layer and being conformal with the trailing side wall, a second portion of the trailing seed layer being recessed from the ABS, adjacent to the first portion of the trailing seed layer, nonconformal with portion of the trailing sidewall nonmagnetic gap layer and nonconformal with the trailing side wall;

a first side seed layer comprising the first magnetic material deposited on the first side wall nonmagnetic gap layer, and a second side seed layer comprising the first magnetic material deposited on the second side wall nonmagnetic gap layer;

wherein the first magnetic material has a magnetic moment ($B_s$) between 2.0 T and 2.4 T.

2. The recording transducer of claim 1 wherein the first side wall seed layer and second side wall seed layer each have a thickness of between 25 nm and 50 nm.

3. The recording transducer of claim 1 wherein the first magnetic material is deposited by physical vapor deposition (PVD) or ion beam deposition (IBD).

* * * * *